(12) United States Patent
Randell et al.

(10) Patent No.: US 7,536,325 B2
(45) Date of Patent: May 19, 2009

(54) METHOD AND SYSTEM FOR GENERATING ACCOUNT RECONCILIATION DATA

(75) Inventors: Wayne L. Randell, Oakville (CA); Leonard A. Podgurny, Mississauga (CA); Edward A. Widlake, Grimsby (CA)

(73) Assignee: Canadian National Railway Company, Montreal (CA)

( * ) Notice: Subject to any disclaimer, the term of this patent is extended or adjusted under 35 U.S.C. 154(b) by 953 days.

(21) Appl. No.: 10/259,989

(22) Filed: Sep. 30, 2002

(65) Prior Publication Data

US 2004/0064375 A1 Apr. 1, 2004

(51) Int. Cl.
*G06Q 15/00* (2006.01)
(52) U.S. Cl. .......................... 705/30; 705/34
(58) Field of Classification Search ............. 705/26–27, 705/30, 34, 28
See application file for complete search history.

(56) References Cited

U.S. PATENT DOCUMENTS

| | | | |
|---|---|---|---|
| 5,627,973 A | 5/1997 | Armstrong et al. | |
| 5,635,906 A | 6/1997 | Joseph | |
| 5,826,241 A | 10/1998 | Stein et al. | |
| 5,878,139 A | 3/1999 | Rosen | |
| 5,920,847 A | 7/1999 | Kolling et al. | |
| 5,963,925 A | 10/1999 | Kolling et al. | |
| 5,978,780 A | 11/1999 | Watson | |
| 5,983,208 A | 11/1999 | Haller et al. | |
| 6,029,150 A | 2/2000 | Kravitz | |
| 6,032,131 A | 2/2000 | Vogel | |
| 6,032,132 A | 2/2000 | Nelson | |
| 6,044,362 A | 3/2000 | Neely | |
| 6,047,268 A | 4/2000 | Bartoli et al. | |
| 6,052,671 A | 4/2000 | Crooks et al. | |
| 6,070,150 A | 5/2000 | Remington et al. | |
| 6,078,907 A | 6/2000 | Lamm | |
| 6,128,603 A | 10/2000 | Dent et al. | |
| 6,138,107 A | 10/2000 | Elgamal | |
| 6,144,726 A | 11/2000 | Cross | |
| 6,292,789 B1 | 9/2001 | Schutzer | |
| 6,401,098 B1 | 6/2002 | Moulin | |
| 6,607,124 B1 | 8/2003 | Junkins et al. | |
| 6,750,885 B1 | 6/2004 | Finch, II et al. | |
| 6,826,542 B1 | 11/2004 | Virgin et al. | |
| 6,832,250 B1 | 12/2004 | Coons et al. | |
| 6,847,942 B1 * | 1/2005 | Land et al. ..................... 705/30 |
| 6,856,974 B1 | 2/2005 | Ganesan et al. | |
| 6,868,406 B1 | 3/2005 | Ogg et al. | |
| 6,931,402 B1 | 8/2005 | Pereira, III | |
| 6,952,780 B2 | 10/2005 | Olsen et al. | |

(Continued)

FOREIGN PATENT DOCUMENTS

CA 2220735 11/1996

(Continued)

*Primary Examiner*—F. Zeender
*Assistant Examiner*—Garcia Ade (57) ABSTRACT

A method and system for providing information regarding a customer account are provided. The customer account includes a plurality of entries, each entry being indicative of a request for payment where the request for payment is being issued by a biller entity to a customer entity. A payment record including remittance detail data is received over a network account reconciliation data at least in part on the basis of the remittance detail data and the entries in the customer account. A signal suitable for causing information derived from the account reconciliation data to be displayed on a display screen is then transmitted.

12 Claims, 7 Drawing Sheets

U.S. PATENT DOCUMENTS

| | | |
|---|---|---|
| 6,968,319 B1 | 11/2005 | Remington et al. |
| 7,206,768 B1 | 4/2007 | deGroeve et al. |
| 2002/0032651 A1* | 3/2002 | Embrey .................. 705/40 |
| 2002/0116334 A1 | 8/2002 | Bennett et al. |
| 2002/0120559 A1 | 8/2002 | O'Mara et al. |
| 2002/0194126 A1 | 12/2002 | Randell et al. |
| 2002/0194127 A1 | 12/2002 | Randell et al. |
| 2002/0198830 A1 | 12/2002 | Randell et al. |
| 2003/0140004 A1* | 7/2003 | O'Leary et al. ............ 705/39 |
| 2003/0167229 A1 | 9/2003 | Ludwig et al. |
| 2003/0191701 A1* | 10/2003 | Haseltine et al. .......... 705/34 |
| 2004/0034594 A1* | 2/2004 | Thomas et al. ............ 705/39 |
| 2006/0259427 A1 | 11/2006 | Randell et al. |

FOREIGN PATENT DOCUMENTS

| | | |
|---|---|---|
| CA | 2203756 | 3/1997 |
| CA | 2236432 | 5/1997 |
| CA | 2267951 | 4/1998 |
| CA | 2295615 | 1/1999 |
| CA | 2302577 | 3/1999 |
| CA | 2175473 | 8/1999 |
| CA | 2307497 | 2/2000 |
| CA | 2229012 | 5/2002 |
| CA | 2 345 505 A1 | 10/2002 |
| CA | 2 345 598 A1 | 10/2002 |
| CA | 2 345 886 A1 | 11/2002 |

* cited by examiner

Back  Stop  Print                    Main Menu  Job Aids  FAQ Help  Close Window User ID  JSmithABC          Customer Name  ABC           Call toll-free
                                                       ( 1-800-361-8198 )

UPLOAD PAYMENT                         Session ID  96208581

PAYMENT DATE: [2001-10-29 ▼] ← 302
PAYMENT AMOUNT: [          ] ← 304
PAYMENT CURRENCY: [ ▼] ← 306
PAYMENT VEHICLE: [   ▼] ← 308
PAYMENT VEHICLE IDENTIFIER: [          ] ← 310

FILE FORMAT(SOURCE): [Fortune 1000 V3.2 ▼] ← 312
FILE NAME TO UPLOAD: [          ] [Browse...] ← 314

[UPLOAD] ← 320

METHOD AND SYSTEM FOR GENERATING ACCOUNT RECONCILIATION DATA

FIELD OF THE INVENTION

This invention relates to a system and method for facilitating online commerce over a public network such as the Internet or an interactive T.V. cable network. More particularly, this invention relates to a system and method for conducting online processing of an invoice including the generation of account reconciliation data.

BACKGROUND OF THE INVENTION

Online commerce has experienced dramatic growth in recent years and this growth is expected to continue into the coming decades. Internet service providers are, more and more, connecting users to the Internet at no cost, thus eliminating barriers to an Internet connection. At the same time, merchants are increasingly developing sites on the World Wide Web (or simply "WWW" or "Web") that customers can access to order goods and/or services. It is now fairly common for a customer to browse a merchant's catalogue, select a product or service and place an order for the product/service, all electronically over the Internet. Similarly, it is becoming increasingly common for merchants to allow payment of invoices electronically. Typically, the invoice is sent electronically to the customer via electronic mail or made available to the customer over a network by providing the customer with network access capability.

U.S. Pat. No. 6,128,603 issued to Dent et al. on Oct. 3, 2000 describes a consumer-based system for analyzing, managing and paying electronic bill statements received from a biller. The biller electronically transmits a customized statement to a consumer's computer terminal over the Internet. The biller's electronic bill is presented to the consumer through a user interface. After reviewing the electronic bill the consumer can enter how much of the bill to pay, from which account to pay from, and the desired payment date. The entered information is then transmitted to the biller for processing. The contents of U.S. Pat. No. 6,128,603 are incorporated herein by reference.

Similarly, U.S. Pat. No. 6,070,150, issued to Remington et al. on May 30, 2000, describes an electronic payment system in which a biller electronically transmits a bill to a consumer over the Internet. The bill may arrive at the consumer's terminal via email or a through a notification for the consumer to check a billing mailbox. The consumer receives the bill that can be displayed in the form of a user interface. After reviewing the bill the consumer is able to enter the amount to be paid, the date of payment and from which account the money can be taken. The system described in Remington et al. also includes the ability to let the consumer dispute an item in an invoice. The contents of U.S. Pat. No. 6,070,150 are incorporated herein by reference.

A deficiency with the above-described systems for the electronic payment of invoices is that they are ill suited to certain business-to-business environments. In a typical business setting involving merchant entities manipulating large numbers of invoices, when a customer pays an invoice to a merchant entity, a check is written and sent to a post office box and directed to a lock box site. A check can be used to pay one or more invoices and is typically accompanied by remittance details to allow matching the check to one or more invoices issued by the merchant entity. The bank manages the checks received at the lock box site and keys in the remittance details into an electronic format that is forwarded to the merchant entity for further processing. The merchant entity applies the remittance details received from the bank to the accounts receivable to reconcile the customer account. For the keying of the remittance details into an electronic format, the bank charges the merchant entity a fee for the processing of each check. The fees can be significant without accounting for the delays in processing of the bank.

Consequently there exists a need in the industry to provide an improved system and method for providing remittance details and generating account reconciliation data regarding a customer account that alleviates at least in part the deficiencies of prior art systems and methods.

SUMMARY

In accordance with a broad aspect, the invention provides a method for providing information regarding a customer account. The customer account includes a plurality of entries, each entry being indicative of a request for payment. A payment record is received over a network from a user associated to the customer account. The payment record includes remittance detail data. Account reconciliation data is generated at least in part on the basis of the remittance detail data and the entries in the customer account. A signal is then transmitted over a network, the signal suitable for causing information derived from the account reconciliation data to be displayed on a display screen.

Advantageously, the invention allows a user associated with a customer entity to transmit proprietary electronic remittance detail files including remittance detail data to the biller system by uploading the remittance detail files over a network. The uploaded remittance detail file is then used by the biller system to generate reconciliation data for the customer account.

Another advantage of the present invention is that it allows a user and a biller entity to have access to the same payment records in contrast to payment records provided by a third party such as a bank. This allows discrepancies in the payment record information to be identified and corrected more readily since the user and the biller entity are looking at the same information.

Advantageously, the present invention allows a reduction in the requirement for a third party, such as a bank or value added network, to provide payment detail information. This results in a saving of time in-house for the biller in terms of clerical time.

In a specific implementation, the information derived from the account reconciliation data includes a confirmation message indicating that the payment record has been processed.

In another specific implementation, the information derived from the account reconciliation data includes data indicative of reconciliation events.

Advantageously, the invention allows providing information derived from the account reconciliation data to the user thereby allowing discrepancies between the amounts appearing on the payment record and the requests for payment to be identified early on in the payment process.

In a specific implementation, the account reconciliation data includes a request identifier associated to the corresponding request for payment and an amount data element.

In a specific implementation, the payment record is associated to a corresponding request for payment in the customer account at least in part on the basis of a level of match between the remittance detail data and the corresponding request for payment in the customer account. The account reconciliation data is generated at least in part on the basis of the remittance detail data and the corresponding request for payment.

In a non-limiting implementation, the level of match is indicative of either one of a complete match, a match with variances or an unreconciled item. The account reconciliation data may further include data indicative of differences between the remittance detail data and the corresponding request for payment when the level of match is indicative of a match with variances. A user associated to the customer entity is enabled to provide explanation data in association with the account reconciliation data.

In a specific example of implementation, each entry in the customer account includes a plurality of payment request parameters. The remittance detail data is compared to the payment request parameters to derive a level of match between the given payment record and an entry in the customer account.

In accordance with another broad aspect, the invention provides a computer readable medium including a program element suitable for execution by a computing apparatus for providing information regarding a customer account in accordance with the above described method.

In accordance with another broad aspect, the invention provides a method for providing information regarding a customer account. The customer account includes a plurality of entries, each entry being indicative of a request for payment. The method includes enabling a user at a computer terminal to transmit data indicative of a payment record including remittance detail data associated to the customer account. Information data is caused to be displayed at the computer terminal, the information data being indicative of account reconciliation data derived at least in part on the basis of the remittance detail data and the entries in the customer account.

In a specific implementation, the account reconciliation data includes a request identifier associated to the corresponding request for payment and an amount data element. Optionally, the account reconciliation data further includes a data element indicative of a level of match between the remittance detail data and the entries in the customer account. In a non-limiting implementation, the level of match is indicative of either one of a complete match, a match with variances or an unreconciled item. In a non-limiting implementation, the account reconciliation data includes data indicative of differences between the remittance detail data and the corresponding request for payment when the level of match is indicative of a match with variances. As a variant, a user at the computer terminal is enabled to provide explanation data in association with the account reconciliation data.

In accordance with another broad aspect, the invention provides a computer readable medium including a program element suitable for execution by a computing apparatus for providing information regarding a customer account in accordance with the above described method.

In accordance with another broad as aspect, the invention provides a computer readable storage medium storing a program element for execution by a CPU for providing information regarding a customer account. The customer account includes a plurality of entries, each entry being indicative of a request for payment, the request for payment being issued by a biller entity to a customer entity. The program element includes a first program element component for causing a computer to deliver first information to a user. The first information prompts the user to provide a payment record including remittance detail data. The program element also includes a second program element component responsive to the payment record for generating account reconciliation data at least in part on the basis of the remittance detail data and the entries in the customer account. The program element also includes a third program element for transmitting over a network a signal, the signal being suitable for causing second information derived from the account reconciliation data to be displayed on a display screen.

In a non-limiting implementation, the first information is delivered to the user by displaying information on a screen. The user provides the payment record through an input device selected in the group consisting of keyboard, pointing device, touch sensitive surface, speech recognition unit and a file.

In a first specific non-limiting implementation, the CPU resides on a server machine and the computer is a client machine in a network arrangement with the server machine. The first program element component generates control messages to the client machine to cause the client machine to display information to the user. For example, the control messages may be HTTP messages and the client machine displays information to the user through a web browser. Other suitable message formats and displays may be used without detracting from the spirit of the invention.

In a second specific non-limiting implementation, the CPU resides in the computer.

In accordance with another broad aspect, the invention provides a server system for providing information regarding a customer account. The customer account includes a plurality of entries, each entry being indicative of a request for payment, the request for payment being issued by a biller entity to a customer entity. The server system stores a program element for execution by a CPU including a first program element component for causing a client system connected to the server via a network to display first information to a user. The first information prompts the user to provide a payment record including remittance detail data. The program element also includes a second program element component responsive to the payment record for generating account reconciliation data at least in part on the basis of the remittance detail data and the entries in the customer account. The program element also includes a third program element component for transmitting a signal to the client system over a network, the signal being suitable for causing information derived from the account reconciliation data to be displayed on a display screen at the client system.

In accordance with yet another broad aspect, the invention provides a client-server system for providing information regarding a customer account. The customer account includes a plurality of entries, each entry being indicative of a request for payment, the request for payment being issued by a biller entity to a customer entity. The client-server system includes a client system and a server system operative to exchange messages over a data network. A first program element component executed on the server system is for sending messages to the client system for causing the client system to display first information to a user. The first information prompts the user to provide a payment record including remittance detail data. The client system is operative to send messages to the server to communicate to the server the payment record including remittance detail data. A second program element component executed on the server is responsive to the payment record for generating account reconciliation data at least in part on the basis of the remittance detail data and the entries in the customer account. A third program element component executed on the server is for a second program element component for transmitting to the client system over a network a signal. The signal is suitable for causing information derived from the account reconciliation data to be displayed on a display screen at the client system.

Other aspects and features of the present invention will become apparent to those ordinarily skilled in the art upon review of the following description of specific embodiments of the invention in conjunction with the accompanying figures.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION

Figure 1:
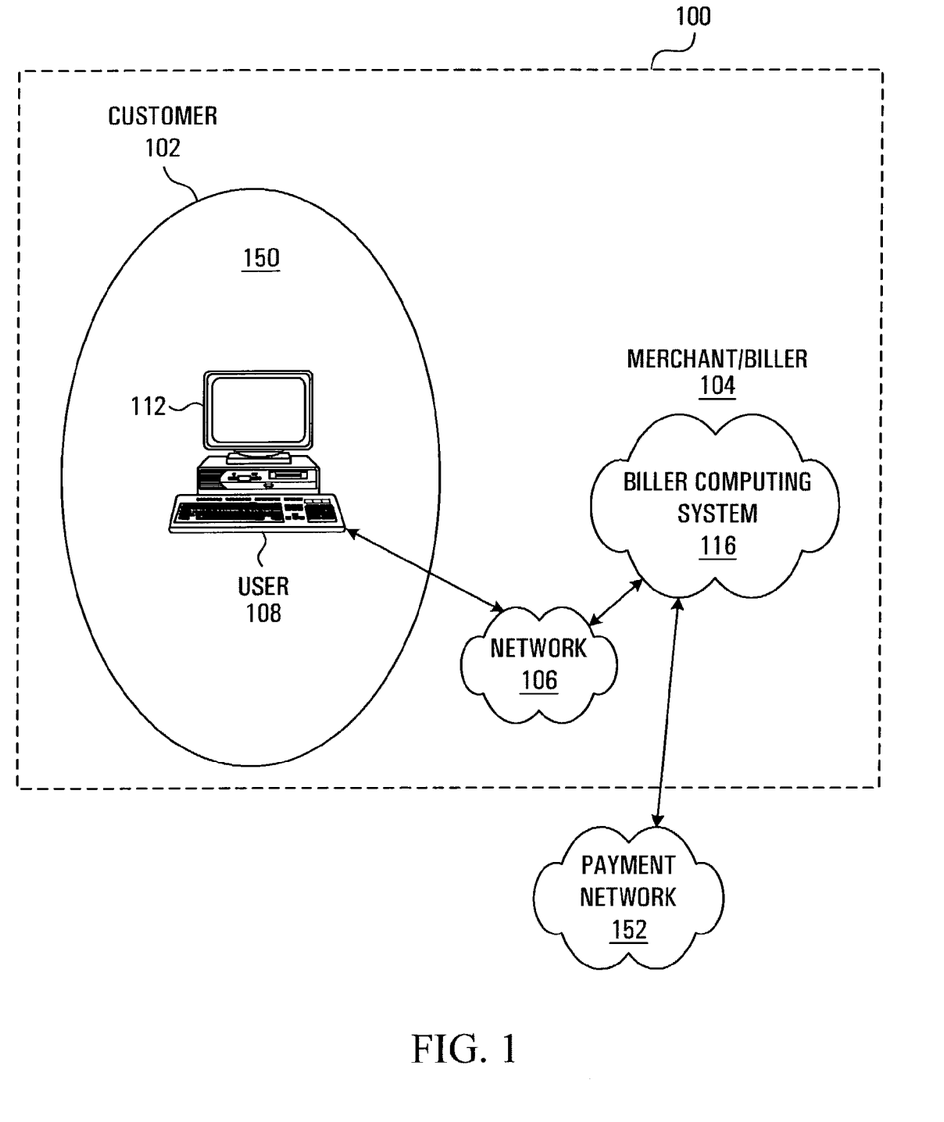
FIG. 1 is a block diagram of a system suitable for providing information regarding a customer account in accordance with an embodiment of the invention, including a biller computing system 116, a network 106, and a customer computing system 150.

FIG. 1 shows a system 100 for providing account reconciliation data in accordance with a specific implementation. The system 100 allows a customer entity 102 to provide payment records including remittance detail data to a specific biller entity 104 such as to allow the biller entity 104 to generate account reconciliation data on the basis of the payment records provided by the customer. The system 100 includes a biller computing system 116 and a customer computing system 150 interconnected through a network 106. The biller computing system 116 and the customer computing system 150 include tools for facilitating online commerce transactions between the customer entity 102 and the biller entity 104.

The network 106 is a data communication network interconnecting the customer computing system 150 and the biller computing system 116. In a specific example of implementation, the network 106 is a public network. In the illustrated implementation, the data communication network 106 is embodied in the Internet. It is to be noted that the data communication network 106 may be implemented as a network other that the Internet such as an interactive television (ITV) network, a private network such as an Intranet or any other suitable network.

Customer Computing System 150

The customer computing system 150 comprises one or more computing units 112, each associated to a respective user 108. The computing unit 112 is generally in the form of a personal computer, although other types of computing units may be used including laptops, notebooks, hand-held computers, set top boxes, and the likes. The computing unit 112 may be connected to other computing units over an Intranet or may be a stand-alone computing unit. The computing unit 112 is provided with a connection to the network 106. The connection may be a permanent connection through a server at the customer's premises, or alternatively, a given computing unit may occasionally connect to the network 106 through the use of a dial-up connection using suitable devices, such as a modem for example. For the purpose of simplicity, the examples described herein below consider a customer computing system 150 including a single customer computing unit 112 associated to a first user 108. It will be readily appreciated that a customer computing system 150 including in excess of a single customer-computing unit remains within the invention.

Figure 2A:
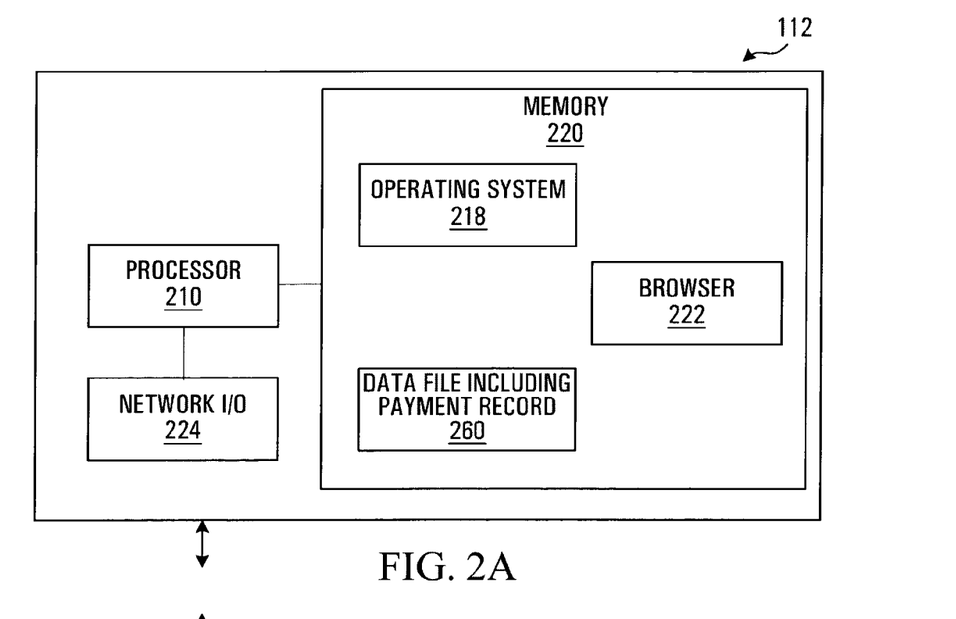
FIG. 2a is a block diagram depicting a customer computing unit in the customer computing system 150 shown in FIG. 1 in accordance with an embodiment of the invention.

FIG. 2a depicts a block diagram of customer computing unit 112. As shown, the customer computing unit 112 comprises a processor 210, a memory 220 and a network I/O 224 (input/output) for accessing the network 106. The network I/O 224 can be implemented, for example, as a dial-up modem or as a permanent network connection. The processor 210 is adapted to execute program elements stored in the memory 220 for performing certain functions. More specifically, the customer computing unit 112 runs an operating system 218 that supports multiple applications. The operating system 218 is preferably a multitasking operating system that allows simultaneous execution of multiple applications in a graphical windowing environment. The memory 220 also includes a browser program element 222. The browser program element 222 when launched is executed by the processor 210 atop the operating system 218. The customer computer unit 112 may also include e-mail software components (not shown) as well as additional components and modules. These have been omitted from the description for the purpose of clarity.

The memory 220 also includes a data portion 260 suitable for storing remittance detail files. In the specific example of implementation, the memory 220 includes one or more remittance detail files for storing one or more payment records. Such remittance detail files may be in any suitable format allowing information contained therein to be extracted therefrom. The accounts payable department of businesses commonly generates such remittance detail files in order to keep records of what invoices were paid to insure that the checks balance. In a specific implementation, each payment record includes remittance detail data. The remittance detail data describes what the customer is paying. Optionally, each payment record includes a payment vehicle identifier indicative of the medium through which the payment will take place. The vehicle identifier may be indicative of a check number, a bank draft number, a wire transfer number or any other suitable identifier for identifying a medium for transferring funds.

The remittance detail data may include a request identifier, a dollar amount paid, a time data element, a service description data element and a product description data element amongst others. The types of remittance detail data items in each payment record may vary from one payment record to the other without detracting from the spirit of the invention. Consider the following three payment records as non-limiting examples:

a) a first payment record includes remittance detail data indicative of a dollar amount paid and a request identifier in the form of an invoice number;

b) a second payment record includes remittance detail data indicative of a request identifier;

c) a third payment record includes a remittance detail data indicative of a time data element indicative of a shipment date and a dollar amount.

The remittance detail files including payment records are stored in any suitable file format. Non-limiting examples of file formats include text files, spreadsheet files, .pdf files as well as image file formats. It will be appreciated that where image file formats are used, suitable optical character recognition software will be used to extract the information therefrom.

In a first specific example of implementation, a remittance detail file storing payment records includes a data structure in the form of a table where each row is associated to a respective payment record. Table 1 below shown a non-limiting example of a data structure for storing payment records:

TABLE 1

| Request identifier | Amount paid |
|---|---|
| S97468 | 5000$ |
| S97478 | 2600$ |
| S97374 | 1000$ |
| S97946 | 8000$ |
| S94683 | 2000$ |
| S94688 | 2000$ |
|  | 1500$ |

As shown above, certain records may have missing information such as a missing request identifier or a missing dollar amount paid.

In a second specific example of implementation, each remittance detail file storing payment records is associated to a respective payment vehicle identifier. Table 2 below shows a non-limiting example of a data structure including payment records:

TABLE 2

| Request identifier | Amount paid | Product description | Check No. |
|---|---|---|---|
| S97468 | 5000$ | Portable remote control unit | 1234567890 |
| S97478 | 2600$ | Leather couch | 1234567890 |
| S97374 | 1000$ | 32" television | 3743558 |
| S97946 | 8000$ | Surround sound system | 38551 |
| S94683 | 2000$ | Computer | 867846 |
| S94688 | 2000$ | Trip to Paris | 24532 |
|  | 1500$ | Stove | 23455 |

It is to be understood that the above data structures are shown for the purpose of illustration only and that other suitable data structures are possible without detracting from the spirit of the invention.

Biller Computing System 116

The biller computing system 116 includes one or more computer servers and one or more computing apparatuses. The system includes program elements allowing the biller entity 104 to manage customer invoices and to provide electronic processing of invoices. The biller computing system 116 may also include modules for connection to a payment network 152 (shown in FIG. 1). The payment network 152 represents existing networks that presently accommodate transactions for credit cards, debit cards, direct debits, checks and other types of financial payment processes. The biller computing system 116 receives from the payment network 152 data elements associated to respective customers and indicative of an amount paid. For example, for each check received at the lock box site, a record is generated indicative of the amount paid by a given customer. This record is then sent to the biller computing system 116. A description of the payment network 152 and of the interaction of the biller computing system 116 with the payment network 152 is not necessary for the understanding of the present invention and as such will not be described.

Figure 2B:
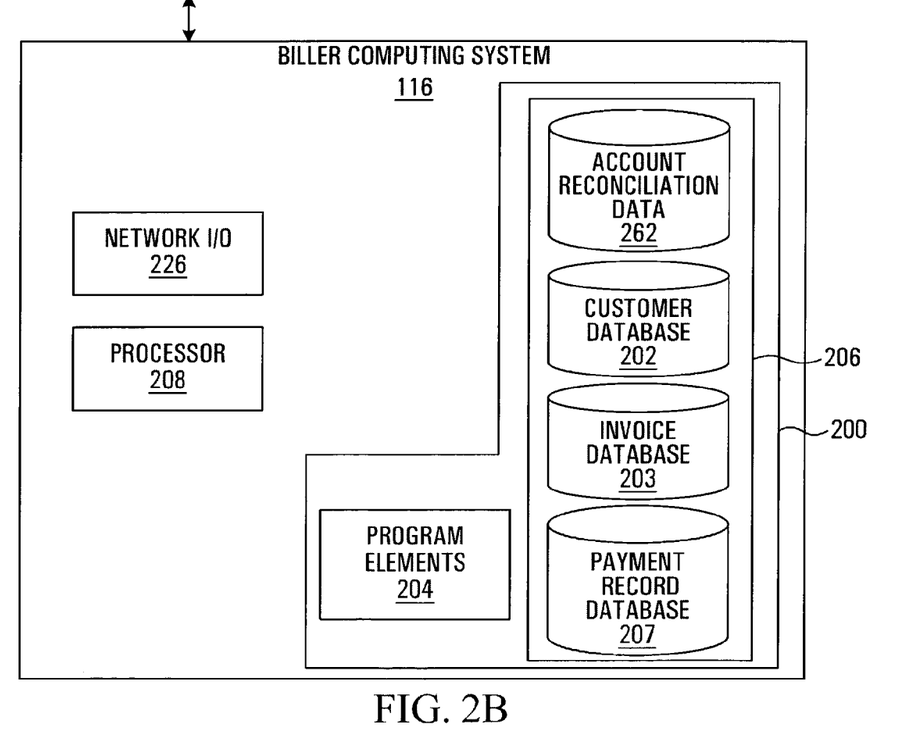
FIG. 2b is a block diagram depicting the biller computing system 116 shown in FIG. 1 in accordance with an embodiment of the invention.

FIG. 2b shows a block diagram depicting a schematic diagram of the biller computing system 116. As depicted, the biller computing system 116 comprises a processor 208, a memory 200 and a network I/O 226 (input/output) for connection to the network 106. The network I/O 226 is preferably implemented as a permanent network connection although dial up connections may be suitable in certain embodiments. For example, if the biller computing system 116 interacts with the customer computing system 150 via e-mail, then a dial-up connection may be suitable.

The processor 208 is adapted to execute program elements 204 stored in the memory 200 for performing various functions. The memory 200 also has a data portion 206 including a customer database 202, an invoice database 203, a database for storing customer payment records 207 and account reconciliation data 262. It will be readily appreciated that the biller computing system 116 may include additional components and modules. These have been omitted from the description for the purpose of clarity.

The customer database 202 includes information pertaining to the customers of the biller entity. In a non-limiting implementation, for each customer entity, an entry is provided including various information data elements associated to the customer entity. Amongst others, each entry includes a user identifier with a corresponding password. The user identifiers are provided by the customer entity 102 to the biller 104 via a registration process. The biller computing system 116 stores at the biller entity 104 a customer account in the customer database 202 associated to each respective customer.

The invoice database 203 includes for each customer in the customer database 202 a list of payment requests associated to invoices that are not fully paid. Each payment request includes a plurality of payment request parameters including, for example, a payment request identifier, dollar amount due, a time data element, a service description data element and a product description data element. Other data elements may be added and certain items may be omitted without detracting from the spirit of the invention. The table below shows a non-limiting example of a list of payment requests.

TABLE 3

| Payment Requests for Customer ABC INC. | | |
|---|---|---|
| Payment request identifier (invoice number) | Amount due | Product description |
| S97468 | 5000$ | Portable remote control unit |
| S97478 | 2700$ | Leather couch |
| S97374 | 1000$ | 32" television |
| S97946 | 8000$ | Surround sound system |
| S94683 | 10000$ | Dining room set |
| S94688 | 2200$ | Trip to Cuba |
| S94693 | 1500$ | Stove |

The database for storing customer payment records 207 stores a copy of remittance detail files received from the customer entity 150. In other words, the remittance detail files originally provided by a customer are preferably maintained at the biller site. Advantageously, this allows a user at the biller site to have access to the same data as the customer, which is particularly practical in the case of billing disputes since both parties have access to the same information. The table below shows a non-limiting example of a list of payment records.

TABLE 4

Payment Records for Customer ABC INC.

| Request identifier | Amount paid | Product description |
|---|---|---|
| S97468 | 5000$ | Portable remote control unit |
| S97478 | 2600$ | Leather couch |
| S97374 | 1000$ | 32" television |
| S97946 | 8000$ | Surround sound system |
| S94683 | 2000$ | Computer |
| S94688 | 2000$ | Trip to Paris |
|  | 1500$ | Stove |

The database for storing account reconciliation data 262 stores the results of the reconciliation process between the remittance details in the remittance detail file sent by the customer and the entries in the invoice database 203. The invoice database 203 includes a plurality of entries, each entry being associated to a reconciliation event in the database for storing account reconciliation data 262. In a specific example, each entry includes a request identifier and an amount. In accordance with a variant, each entry further includes a data element indicative of the level of match between a given request for payment in the invoice database and a payment record. The level of match may be indicative of either one of a complete match, a match with variances or an unreconciled item. In accordance with non-limiting implementation, when the level of match is indicative of a match with variances, the reconciliation event includes account reconciliation data indicative of differences between the remittance detail data and the corresponding request for payment. In accordance with another non-limiting implementation, when the level of match is indicative of a match with variances, the reconciliation event includes customer explanation data describing the reason for differences between the remittance detail data and the corresponding request for payment.

Optionally, each entry further includes a payment vehicle identifier. The payment vehicle identifier may be indicative of a check number, a bank draft number, a wire transfer number or any other suitable identifier for identifying a medium for transferring funds.

The table 5 below shows a specific non-limiting example of a table including entries associated to respective reconciliation events on the basis of the entries shown in tables 3 and 4 above.

TABLE 5

Account Reconciliation Data for Customer ABC INC.

| Payment request identifier | Amount due | Amount paid | Level of match | Differences |
|---|---|---|---|---|
| S97468 | 5000$ | 5000$ | Complete | |
| S97478 | 2700$ | 2600$ | match with variances | Amount due ≠ amount paid |
| S97374 | 1000$ | 1000$ | Complete | |
| S97946 | 8000$ | 8000$ | Complete | |
| S94683 | 10000$ | 2000$ | Unreconciled | Amounts and product description do not match. |
| S94688 | 2200$ | 2000$ | match with variances | No match for product description Amount due ≠ amount paid |
| S94693 | 1500$ | 1500$ | Complete | |

In a specific implementation, a customer account entry in the customer database 202 includes links to an entry in the invoice database 203, an entry in the account reconciliation database 262 and an entry in the database of payment records 207. When the biller computing system 116 generates an invoice at the biller entity, it stores the latter in the invoice database 203 in association with a customer account entry in the customer database 202. When a user sends to the biller computing system 116 a remittance detail file including payment records, the remittance detail file is stored in the payment record database 207 in association with a customer account entry in the customer database 202. The program element 204 processes the remittance detail file stored in the payment record database 207 to generate account reconciliation data which is stored in the account reconciliation database 262 in association with a customer account entry in the customer database 202.

The account reconciliation data in account reconciliation database 262 can then be used by the accounts receivable department at the biller entity site to complete the reconciliation of the customer account. For example, the accounts receivable department receives from the payment network 152 data indicative of an amount received from a specific customer. The accounts receivable department applies the amount received to the outstanding amount due for that customer on the basis of the account reconciliation data in account reconciliation database 262.

Program Element 204

The memory 200 also includes a program element 204 for operating on the data 206 for generating account reconciliation data for a customer entity. The generated account reconciliation data is stored in database 262.

A typical interaction will better illustrate the functioning of the system for providing account reconciliation data 100 and of program element 204.

Figure 3:
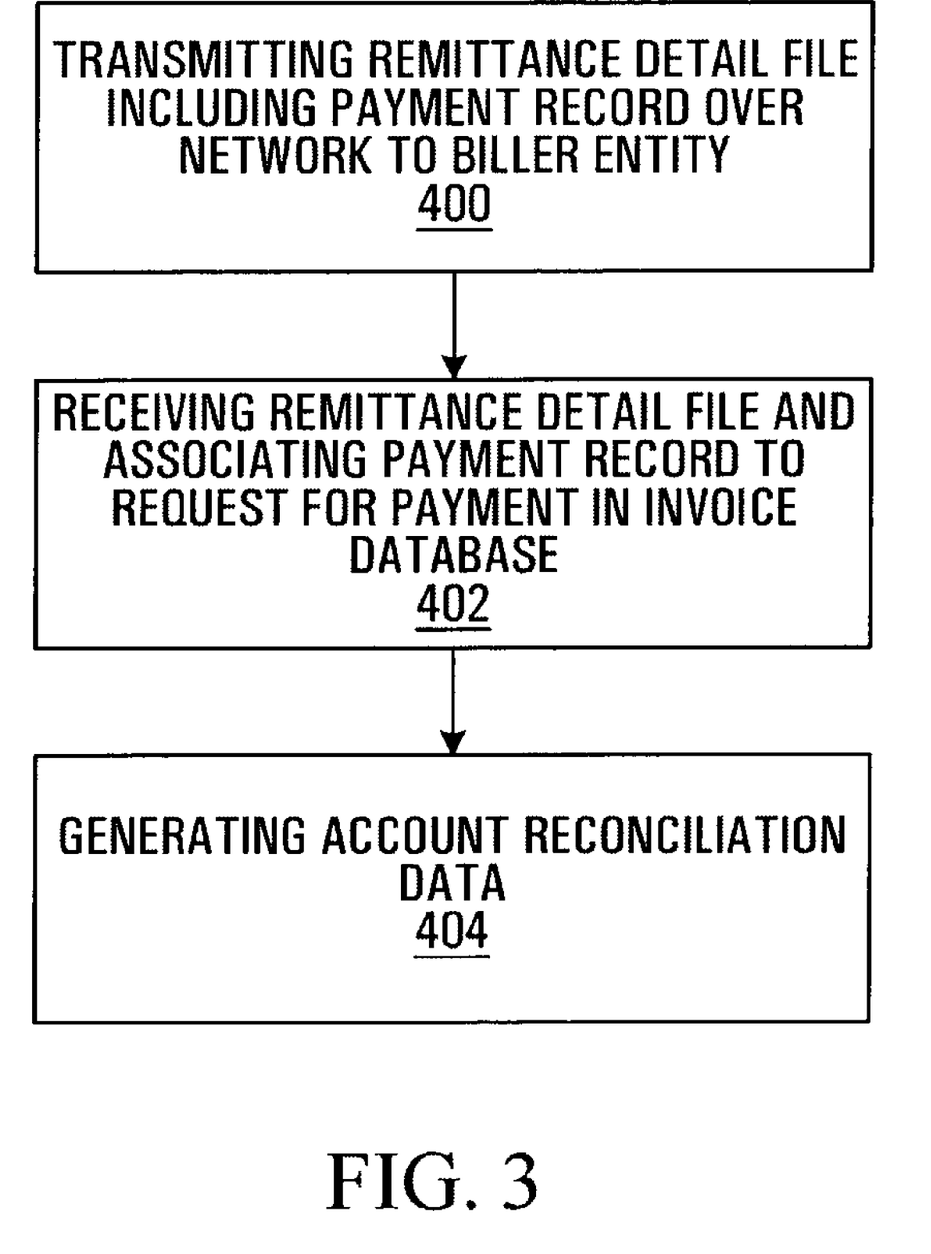
FIG. 3 is a simplified flow diagram of a process for generating account reconciliation data for a user account in accordance with a specific example of implementation of the invention.

With reference to FIGS. 3 and 1 of the drawings, at step 400, a user associated to a customer entity transmits to the biller computing system 116 over network 106 a remittance detail file storing one or more payment records including remittance detail data. In a first non-limiting example of implementation, the remittance detail file including payment records is transmitted via e-mail to the biller computing system 116. Preferably in such cases, appropriate secure e-mail transmission procedures are used in order to insure suitable confidentiality of the information being transmitted.

In a second non-limiting example of implementation, the remittance detail file including payment records is transmitted over network 106 through a file upload feature in a designated website or over network 106 through any other suitable network protocols.

At step 402 the biller computing system 116 receives the remittance detail file and stores it in the database for storing customer payment records 207. Each payment record is associated to a corresponding request for payment in the invoice database 203.

The remittance detail data elements in the payment record are compared to corresponding payment request parameters in the invoice database 203 to derive a level of match between a payment record and a given payment requests. The table below shows a non-limiting example of the mapping between the payment request parameters and the remittance detail data.

| Remittance detail data element | Corresponding payment request parameter |
|---|---|
| request identifier | request identifier |
| dollar amount paid | dollar amount due |
| time data element | time data element |
| service description data element | service description data element |
| product description data element | product description data element |

In a variant, each customer may transmit remittance detail files in a customer specific format. The program element 204 maps the remittance detail files to a standard payment file format prior to comparing the remittance detail data to corresponding payment request parameters in the payment requests in the invoice database 203.

In a specific implementation, a plurality of levels of match are provided. In a non-limiting example, the levels of match include a complete match, a match with variance and an unreconciled item.

In a specific non-limiting implementation, the request identifier and the amount paid in the payment record are compared to the request identifier and the amount due in the payment request in order to derive a level of match.

The level of match between a payment record and a payment request may be indicative of a complete match. Rules may be used to determine when a level of match is an exact match. For example, a rule may indicate that when the remittance detail data elements are an exact match to the payment request parameters, the level of match is a complete match. Another rule may indicate that when certain remittance detail data elements are an exact match to certain ones of the payment request parameters, the level of match is a complete match. Another rule may indicate that when an amount paid in a payment record and an amount due in payment request differ by less than a threshold petty amount, but that all other remittance detail data elements are a match, then the match is indicative of a complete match.

The level match between a payment record and a payment request may be indicative of a match with variances. Rules may be used to determine when a level of match is a match with variances. For example, a rule may indicate that when a certain remittance detail data element is not a match to a corresponding payment request parameter and that all other remittance detail data elements are a match, then the level of match is a match with variances. In another example, the rules may indicate that when an amount paid in a payment record and an amount due in payment request differ but that all other remittance detail data elements are a match, then the match is indicative of a match with variances.

The level match between a payment record and a payment request may be indicative of an unreconciled item. Rules may be used to determine when a level of match is indicative of an unreconciled item. For example, a rule may indicate that when a certain remittance detail data element is not a match to a corresponding payment request parameter, then the level of match is an unreconciled item.

The person skilled in the art will appreciate that the above rules have been presented for the purpose of illustration only and that many other suitable rules may be used. Such rules will generally be determined on the basis of heuristics.

In order to associate a payment record to a corresponding request for payment, the remittance detail data elements in each payment record are compared to corresponding payment request parameters in the payment requests in the invoice database 203 to locate a payment request with a highest level of match. Many different search techniques may be used to locate a highest level of match without detracting from the spirit of the invention. Such search techniques are well-known in the art and as such will not be described further here.

Once a payment record is associated to a corresponding request for payment, at step 404, account reconciliation data is generated at least in part on the basis of the remittance detail data and the corresponding request for payment.

In a specific example, at step 404, a plurality of account reconciliation events entries are generated, each account reconciliation event including account reconciliation data associating a request for payment identifier to an amount. Preferably, the account reconciliation data also includes a data element indicative of the level of match. In accordance with a variant, each entry further includes a data element indicative of the level of match between a given request for payment in the invoice database and a payment record. The level of match may be indicative of either one of a complete match, a match with variances or an unreconciled item. In accordance with non-limiting implementation, when the level of match is indicative of a match with variances, the reconciliation event includes account reconciliation data indicative of differences between the remittance detail data and the corresponding request for payment. Optionally, each entry further includes a payment vehicle identifier. The payment vehicle identifier may be indicative of a check number, a bank draft number, a wire transfer number or any other suitable identifier for identifying a medium for transferring funds.

The table 6 below shows a specific non-limiting example of a table including entries associated to respective reconciliation events. In the table below, each row is associated to a respective account reconciliation event.

TABLE 6

Account Reconciliation Data for Customer ABC INC.

| Payment request identifier | Amount due | Amount paid | Level of match | Differences |
|---|---|---|---|---|
| S97468 | 5000$ | 5000$ | Complete | |
| S97478 | 2700$ | 2600$ | Match with variances | Amount due ≠ amount paid |
| S97374 | 1000$ | 1000$ | Complete | |
| S97946 | 8000$ | 8000$ | Complete | |
| S94683 | 10000$ | 2000$ | Unreconciled | Amounts and product description do not match. |
| S94688 | 2200$ | 2000$ | Match with variances | No match for product description Amount due ≠ amount paid |
| S94693 | 1500$ | 1500$ | Complete | |

The account reconciliation data generated at step 404 is then stored in database 262.

In accordance with a variant, the account reconciliation data is transmitted to a user at the customer site for display at the customer computer unit. In a non-limiting implementation, when the level of match for a given account reconciliation event is indicative of a match with variances, the user at the customer site is enabled to enter notes in association with the given account reconciliation event. The notes may for example describe the reason for differences between the remittance detail data and the corresponding request for payment. The notes provided by the user are then stored in the account reconciliation database 262 in association with the given account reconciliation event.

The account reconciliation data in account reconciliation database 262 can then be used by the accounts receivable system at the merchant/biller entity site 104 to complete the reconciliation of the customer account. For example, the accounts receivable system receives from the payment network 152 data indicative of an amount received from a specific customer. The accounts receivable system associates the amount received at the bank to the outstanding amount due for that customer on the basis of the account reconciliation data in account reconciliation database 262.

Figure 4:
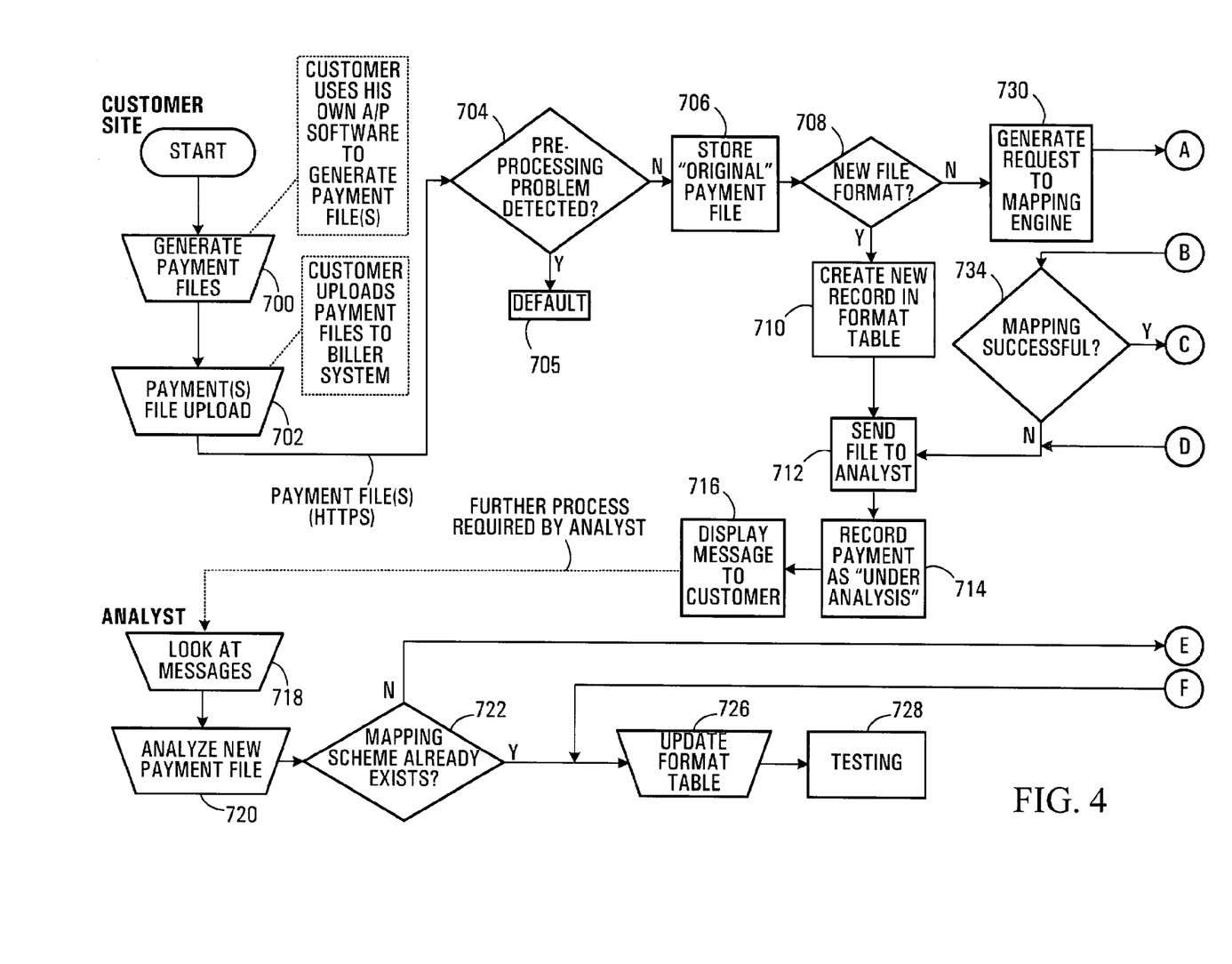
FIG. 4 is a flow diagram depicting in greater detail the process shown in FIG. 3 for generating account reconciliation data in accordance with a specific non-limiting example of implementation of the invention.

FIG. 4 shows another very specific example of implementation of a process for generating account reconciliation data.

At step 700, a user associated to a customer entity generates a remittance detail file storing payment records including remittance detail data. The remittance detail file may be generated using any suitable software program commonly used in the art and the remittance detail file may be in any suitable format.

At step 702, a user associated to the customer entity transmits the remittance detail file generated at step 702 to the biller computing system 116.

At step 704, the program element at the biller computing system 116, performs some pre-processing on the remittance detail file. Such pre-processing may include, without being limited to, verifying whether the remittance detail file is corrupt and checking for viruses.

If a problem is detected at the pre-processing step, a default process 705 is initiated.

If the pre-processing step is successful, at step 706, the remittance detail file is stored in the database for storing customer payment records 207 (shown in FIG. 2).

At step 708, the remittance detail file is processed to determine if the remittance detail file corresponds to a new file format. The file format allows the program element 204 (shown in FIG. 2) to identify the appropriate mapping scheme for mapping remittance detail data in the remittance detail file to request parameters in the invoice database 203 (shown in FIG. 2).

In a specific implementation, a plurality of known file formats is provided to the biller computing system. If the remittance detail file corresponds to a known file format, step 708 is answered in the negative and the system proceeds to step 730. If the remittance detail file does not correspond to a known file format, step 708 is answered in the positive and the system proceeds to step 710.

At step 730, a request is generated to a mapping engine requesting that the remittance detail file be mapped to a standard file format. At step 732, the remittance detail file is mapped, on the basis of the file format associated to the remittance detail file to generate a payment file having a format indicative of a standard payment file format.

At step 734, a test is effected to determine whether the mapping effected at step 732 was successful. In the negative, the system proceeds to step 712 where the remittance detail file is brought to the attention of an analyst associated with the biller entity so that the latter can determine where the problem occurred. If the test at step 734 is successful, the system proceeds to step 736.

At step 736, the remittance detail file mapped in the standard payment file format is processed on the basis of the invoice database 203 (shown in FIG. 2) to associate the payment records to corresponding requests for payment in the invoice database. The association is effected on the basis of levels of match between the payment records and the requests for payment. Following this, account reconciliation data is generated.

At step 738, a test is effected to determine whether the generation of account reconciliation data effected at step 736 was successful. In the negative, the system proceeds to step 712 where the remittance detail file is brought to the attention of an analyst associated with the biller entity. If the test at step 738 is affirmative, the account reconciliation data is stored in database 262 and the system proceeds to step 740.

At step 740, a message is sent to the customer computing unit 112 for causing the latter to display to the user a transaction confirmation message. The transaction confirmation message may be transmitted to the user via e-mail, over a network through a web-based application or any other suitable communication fashion. Various types of information derived from the reconciliation data may be present on the transaction confirmation message. In a first example of implementation, the transaction confirmation message includes a message indicating that the remittance detail file has been processed. In a second example of implementation, the transaction confirmation message includes a message that the remittance detail file has been processed and an indication of the number of items having a given level of match found. In yet a third example of implementation, the transaction confirmation message includes data indicative of the reconciliation data generated at step 736. Optionally, the transaction confirmation message prompts a user at the customer computing unit 112 to enter comments via a user interface (such as a keyboard, mouse, pointer, voice recognition or touch sensitive screen amongst others) associated to the account reconciliation data displayed. In particular, when the level of match for a given account reconciliation event is indicative of a match with variances, the user at the customer site is enabled to enter notes in association with the given account reconciliation event. The notes may for example describe the reason for differences between the remittance detail data and the corresponding request for payment. The notes provided by the user are transmitted back to the biller computing system and stored in the account reconciliation database 262 in association with the given account reconciliation event. Advantageously these notes may assist the accounts receivable department at the biller computing unit to ascertain why certain reconciliation events are associated to a level of match indicative of a match with variances.

Figure 6:
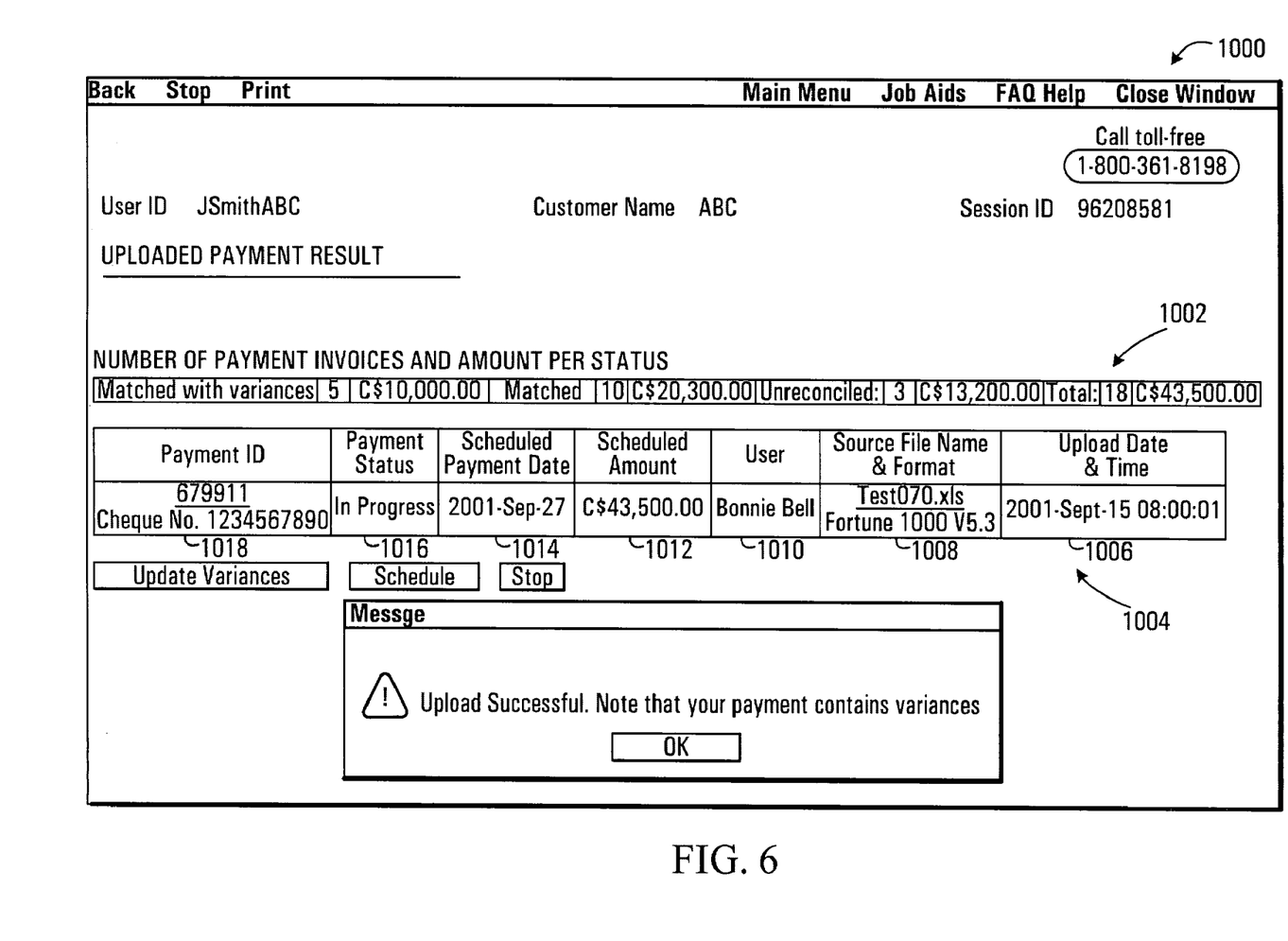
FIG. 6 is a non-limiting example of implementation of a graphical user interface for displaying a transaction confirmation message including account reconciliation data in accordance with a specific non-limiting example of implementation of the invention.

Other types of information may be present on the transaction confirmation screen without detraction from the spirit of the invention. FIG. 6 of the drawings shows a specific non-limiting example of implementation of a transaction confirmation message displayed in the form of a web-based application.

As depicted, the page 1000 includes a first information portion 1004 including details associated with the remittance detail file transmitted by the customer entity. In this example, these details include the date and time 1006 at which the remittance detail file was transmitted to (or alternatively received by) the merchant entity; the format and name of the remittance detail file 1008; the user 1010 associated with the customer entity and who transmitted the remittance detail file; an amount paid 1012 associated to a payment vehicle identifier; a scheduled payment date 1014; a payment status indicator 1016; and a payment vehicle identifier 1018. Additional data may be added and certain data may be omitted without detracting from the spirit of the invention.

The page 1000 includes a second information portion 1002 including reconciliation data associated of the remittance detail file transmitted by the customer entity. In this second information portion, details regarding the number of reconciliation events associated to each level match is shown. Optionally, the user is enabled to view the reconciliation data in greater detail such as to view each reconciliation event individually.

At step 742, the account reconciliation data is stored in the account reconciliation database 262 for future access by the accounts receivable process. At this stage, the account reconciliation data in account reconciliation database 262 can be used by the accounts receivable department at the biller entity site to complete the reconciliation of the customer account. For example, the accounts receivable system receives from the payment network 152 data indicative of an amount received from a specific customer. The accounts receivable department applies the amount received at the bank to the outstanding amount due for that customer on the basis of the account reconciliation data in account reconciliation database 262. This process may be done manually or automatically using suitable computing systems without detracting from the spirit of the invention.

At step 708, if the remittance detail file uploaded by the user does not correspond to a known file format, step 708 is answered in the positive and the system proceeds to step 710.

At step 710, a new customer file format is added to the list of known file formats. The system proceeds to step 712 where the remittance detail file is brought to the attention of an analyst associated with the biller entity.

At step 714, the remittance detail file is marked as being under analysis.

At step 716, a message is sent to the customer computing unit 112 for causing the latter to display to the user a message indicating that the remittance detail file is under analysis. The message may be transmitted to the user via e-mail, over a network through a web-based application or any other suitable communication fashion.

At steps 718 and 720, an analyst associated with the biller entity looks at the remittance detail file to determine whether a mapping scheme between the format of the remittance detail file and the standard payment file format already exists. If no mapping scheme exists, step 722 is answered in the negative and the system proceeds to step 724 where a new mapping scheme is created for the new file format to allow mapping the new file format into the standard payment file format.

If a mapping scheme between the format of the remittance detail file and the standard payment file format already exists, step 722 is answered in the affirmative and the system proceeds to step 726.

At step 726, the list of known file formats is updated to reflect the mapping between format of the remittance detail file and the standard payment file format. Following this, at step 728, suitable testing step for the format of the remittance detail file are effected. The remittance detail file may then resume processing at step 730.

Specific Example of Implementation

In a non-limiting example of implementation, in order to view invoices and upload remittance detail data, the users associated with the customer entity log on to a secure web-site using login names and associated passwords. The account information is displayed on a graphical user interface on the customer's computer terminal. In a typical interaction, users associated to the customer entity access a designated website through a network link by providing a network address in order to view invoices and other account information. The users log on to the secure website by providing login information including a customer identifier, a login name and a password. With reference to FIG. 2, the biller computing system receives the login information and processes it with respect to the customer database 202. More specifically, the processor 208 accesses the customer database 202 to locate the entry corresponding to the customer identifier. If no corresponding entry is found, an error message is returned to the customer entity. If a corresponding entry is found, the processor 208 attempts to locate a record corresponding to the login name provided. If no corresponding record is found, an error message is returned to the user. If a corresponding record is found, the password in the record is compared to the password provided in the login information. If a match is not found, an error message is returned to the user. If a match is found, the user is successfully identified. Once a user is successfully identified, the account information in the invoice database 203 corresponding to the customer identifier is made available to the user and the user is enabled to transmit remittance detail files including remittance detail data to the biller computing system over network 106 (shown in FIG. 1).

In a non-limiting example of implementation, the program element 204 implements a payment module to aid the user in the completion of the online payment process including the transmission of files including remittance detail data. The program element 204 includes a first program element component for causing a customer computing unit to display a graphical user interface for the payment module. In a specific example of implementation, the payment module is configured to provide step-by-step instructions.

Figure 5:
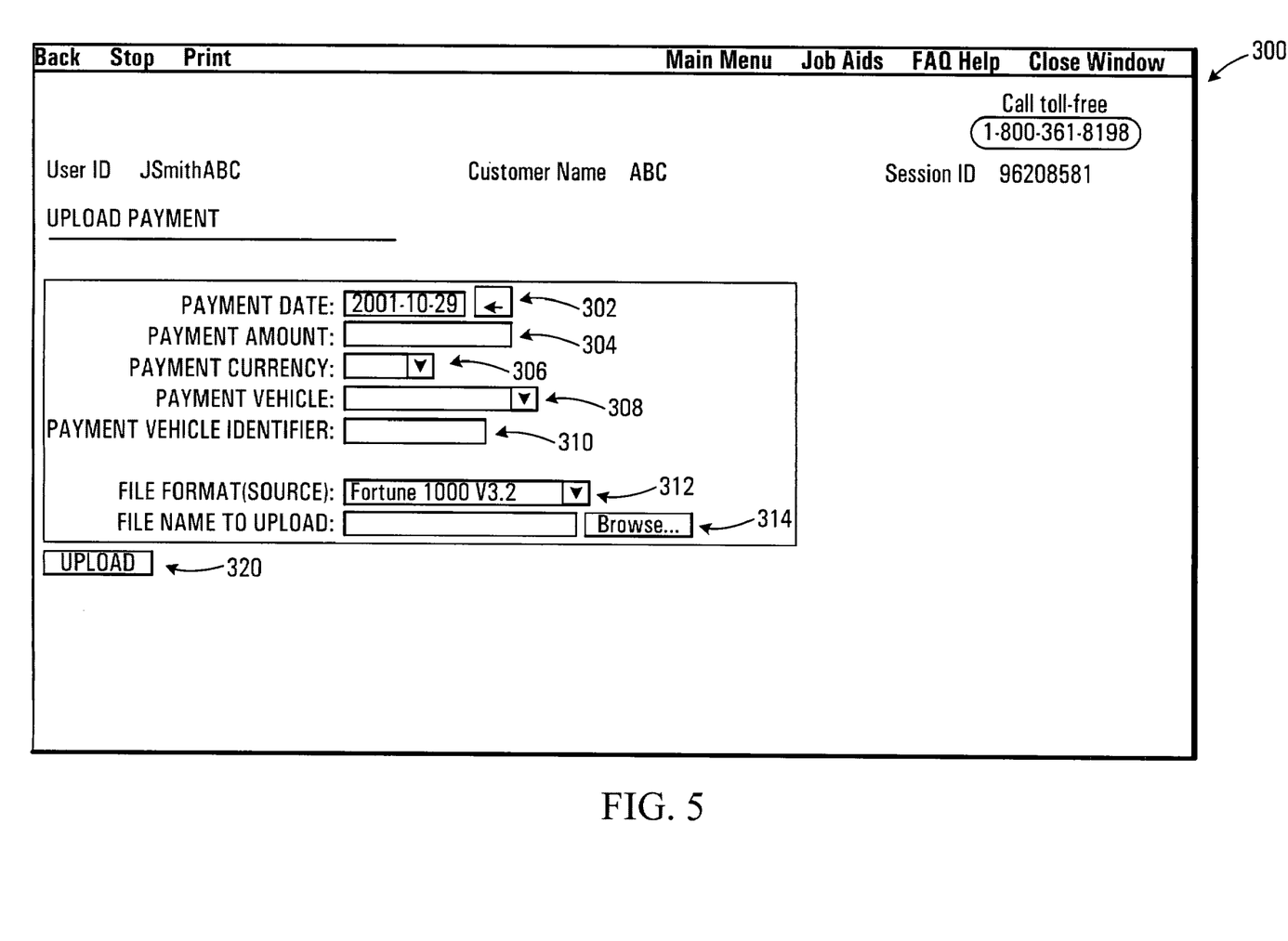
FIG. 5 is a non-limiting example of implementation of a graphical user interface for allowing a user associated with a customer entity to transmit to a biller entity a remittance detail file including payment records in accordance with a specific non-limiting example of implementation of the invention.

FIG. 5 of the drawings shows a specific example of implementation of a user interface suitable for use in connection with a payment module. As shown, the user interface 300 includes a form including various fields prompting the user to provide remittance detail data.

The payment instructions may include providing the biller with a credit card number, with an authorization to debit a bank account, wire transfer information, direct deposit information or a check number amongst others. In the example shown, the interface 300 provides fields for entering the payment date 302, payment amount 304, currency 306, payment vehicle 308 and payment vehicle identifier 310. The payment module further provides a facilitator 314 allowing the user to upload remittance detail files including payment details. The facilitator 314 may be in the form of an editable text field, a pull-down menu or a link to the user's directory structure. Optionally, the interface provides a field 312 for specifying the format of the remittance detail file. Once the user has provided the necessary information, the information is transmitted to the merchant computing system. The interface 300 includes all the necessary routing information to transmit the information entered by the user in the various fields as well as the remittance detail file to the biller computing system. In this specific example, the user transmits the information by pressing an "UPLOAD" button 320 on the user interface 300.

The remittance detail files including remittance detail data once received by the biller computing system is then processed according to the processes described above.

Although the present invention has been described in considerable detail with reference to certain preferred embodi-

The invention claimed is:

1. A method for providing information regarding a customer account, the customer account including a plurality of entries, each entry being indicative of a request for payment issued by a biller entity to a customer entity, each entry including a plurality of payment request parameters, said method comprising:
   a) receiving over a network from a user associated to the customer account a payment record including remittance detail data;
   b) comparing the remittance detail data in the payment record to payment request parameters in the customer account to associate the payment record to a corresponding request for payment in the customer account at least in part based on a level of match between the remittance detail data and the corresponding request for payment in the customer account, the level of match being capable of conveying a complete match, a match with variances, and an unreconciled item;
   c) generating account reconciliation data at least in part on the basis of the remittance detail data and the corresponding request for payment;
   d) transmitting over a network a signal, the signal being suitable for causing information derived from the account reconciliation data to be displayed on a display screen.

2. A method as defined in claim 1, wherein the account reconciliation data includes:
   a) a request identifier associated to the corresponding request for payment;
   b) an amount data element.

3. A method as defined in claim 1, wherein the account reconciliation data includes data indicative of differences between the remittance detail data and the corresponding request for payment when the level of match is indicative of a match with variances.

4. A method as defined in claim 1, said method comprising enabling a user to provide explanation data in association with the account reconciliation data.

5. A method as defined in claim 1, wherein the network is the Internet.

6. A method as defined in claim 1, wherein the remittance detail data includes at least one remittance detail data element selected from the set consisting of a dollar amount paid, a payment request identifier, a time data element, a service description data element and a product description data element.

7. A method as defined in claim 6, wherein the plurality of payment request parameters includes at least one request parameter selected from the set consisting of a dollar amount due, a payment request identifier, a time data element, a service description data element and a product description data element.

8. A method as defined in claim 1, wherein:
   a) an entry in the customer account includes a request parameter indicative of a dollar amount due; and
   b) the payment record includes a remittance detail data element indicative of a dollar amount paid;
   said method comprising comparing the remittance detail data element indicative of a dollar amount paid with a payment request parameter indicative of an amount due in a given entry in the customer amount to derive a level of match.

9. A method as defined in claim 8, wherein a level of match indicative of a complete match is derived when the data element indicative of the amount due differs from the data element indicative of the dollar amount paid by less than a threshold petty amount.

10. A method for providing information regarding a customer account, the customer account including a plurality of entries, each entry being indicative of a request for payment issued by a biller entity to a customer entity, said method comprising:
    a) enabling a user at a computer terminal to transmit data indicative of a payment record including remittance detail data associated to the customer account;
    b) causing information data to be displayed at the computer terminal, the information data being indicative of account reconciliation data derived at least in part on the basis of the remittance detail data and the entries in the customer account, wherein the account reconciliation data includes a data element indicative of a level of match between the remittance detail data and a corresponding entry in the customer account, the level of match being capable of conveying a complete match, a match with variances, and an unreconciled item, the account reconciliation data including data indicative of differences between the remittance detail data and the corresponding entry in the customer account when the level of match conveys of a match with variances.

11. A method as defined in claim 10, wherein the account reconciliation data includes:
    a) a request identifier associated to the corresponding request for payment;
    b) an amount data element.

12. A method as defined in claim 10, said method comprising enabling a user at the computer terminal to provide explanation data in association with the account reconciliation data.

* * * * *